US005494199A

United States Patent [19]

Anderson et al.

[11] Patent Number: 5,494,199

[45] Date of Patent: Feb. 27, 1996

[54] SUCTION HOSE AND FILTER HOLDER

[75] Inventors: Richard P. Anderson, Burnsville; Francis R. Haas, Andover, both of Minn.

[73] Assignee: Wagner Spray Tech Corporation, Minneapolis, Minn.

[21] Appl. No.: 241,506

[22] Filed: May 12, 1994

[51] Int. Cl.$^6$ .................................................... F16K 15/03

[52] U.S. Cl. ........................ 222/464.1; 137/590; 248/79; 248/213.2

[58] Field of Search .................................... 137/590, 592; 248/75, 79, 213.2; 222/382, 464.1

[56] References Cited

U.S. PATENT DOCUMENTS

| | | | |
|---|---|---|---|
| 659,669 | 10/1900 | Haynes | 222/464 X |
| 682,269 | 9/1901 | Poe | 248/79 X |
| 1,439,031 | 12/1922 | Sterrick | 248/79 X |
| 1,627,734 | 5/1927 | Gavaza | 248/79 |
| 2,070,495 | 2/1937 | Strutz et al. | 248/79 X |
| 2,611,568 | 9/1952 | Yoder | 248/79 |
| 2,636,704 | 4/1953 | Norberg | 248/79 |
| 3,204,902 | 9/1965 | David | 248/79 |
| 3,220,680 | 11/1965 | Williams | 248/79 |
| 4,196,747 | 4/1980 | Quigley et al. | 248/79 X |
| 4,318,519 | 3/1982 | Blevins | 248/79 |

OTHER PUBLICATIONS

Owner's Manual for Wagner Pro–Duty Power Painter (255/330), cover and p. 9, (No Date).

*Primary Examiner*—Andres Kashnikow
*Assistant Examiner*—Kenneth Bomberg
*Attorney, Agent, or Firm*—Faegre & Benson

[57] ABSTRACT

A suction hose and filter apparatus for retaining an elongated flexible hose and paint filter to a remote container for use with a hand-held paint spray gun, the apparatus including a clip for holding the apparatus to a rim of a paint container, a guide integrally formed with the clip and positioned to extend from the rim into the interior of the paint container for submerging a distal end of the flexible hose and paint filter into a bottom region of the paint container, wherein the guide includes a pair of longitudinally extending ribs and a plurality of cross members forming a passageway for retaining and restraining the hose against the tendency of the hose to recoil via its memory and move the paint filter away from the bottom region of the paint container.

11 Claims, 2 Drawing Sheets

SUCTION HOSE AND FILTER HOLDER

BACKGROUND OF THE INVENTION

This invention relates to portable spray painting equipment, more particularly to an extended suction set for use with hand-held paint spray guns.

DETAILED DESCRIPTION

Figure 2:
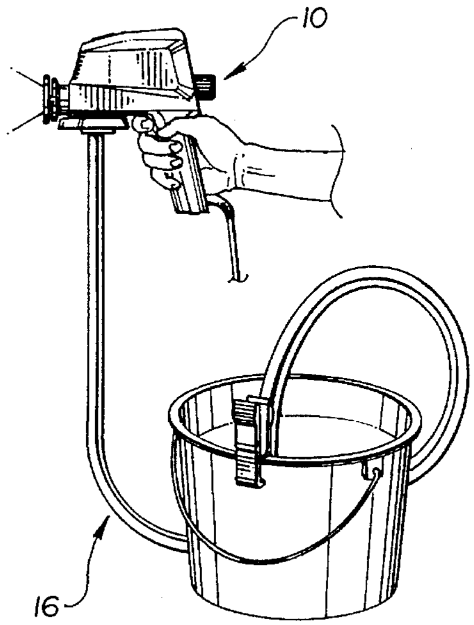
Fig. 2 PRIOR ART
FIG. 2 is a perspective view of the extended suction set of FIG. 1 in operation.
Figure 1:
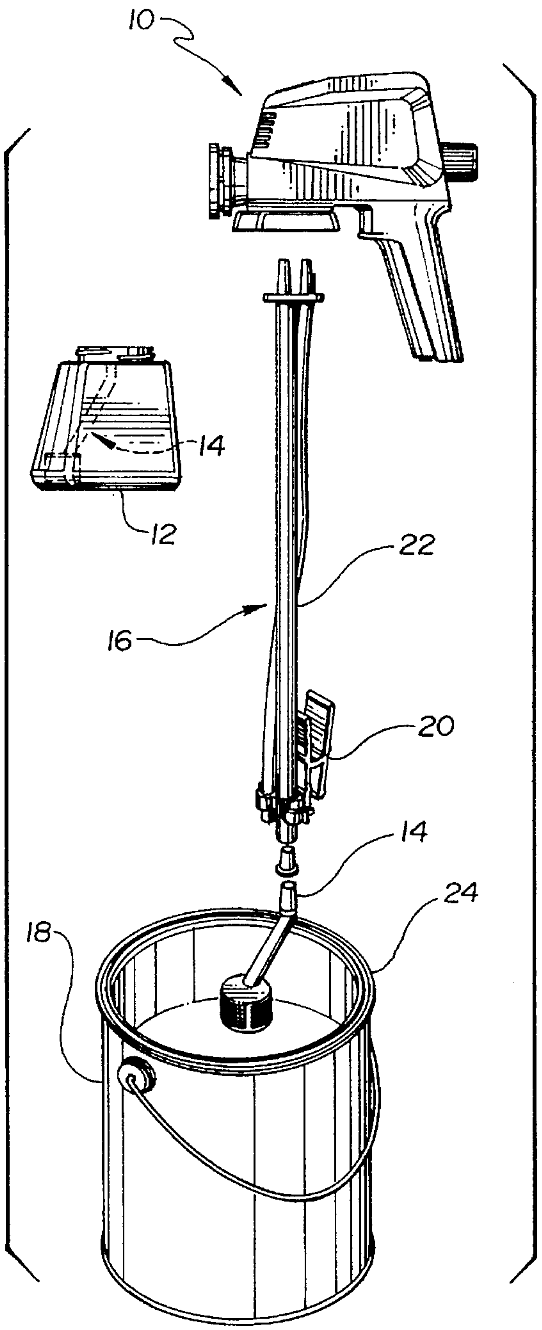
Fig. 1 PRIOR ART
FIG. 1 is an exploded view of a prior art hand-held cup gun showing a conventional cup and filter assembly and an extended suction set and paint container.

Referring now most particularly to FIGS. 1 and 2, a hand-held paint spray gun 10 may be seen. Gun 10 may be used with a paint cup 12 carried by gun 10, in which case a syphon tube and filter assembly 14 will be located within cup 12 when it is secured to gun 10. It is to be understood that in operation paint is contained in cup 12 and is drawn into and sprayed by gun 10.

In the event that a larger amount of paint is desired to be sprayed than can be conveniently carried by cup 12, an extended suction set 16 may be used. Suction set 16 is preferably used in conjunction with the syphon tube and filter assembly 14 to draw paint from a container 18 such as a paint can or bucket. In the prior art, it was known to use a spring clip 20 to hold a suction hose 22 to a rim 24 of bucket 18.

As shown in FIG. 1, spring clip 20 is positioned at one end of flexible hose 22. In this configuration, the length of syphon tube 14 may not permit the attached filter assembly to be placed at the bottom of bucket 18. If the clip 20 is moved up along flexible hose 22, it has been found that a memory in the hose 22 will tend to "recoil" hose 22 moving the syphon tube and filter assembly 14 away from the bottom of bucket 18. The memory in hose 22 is due to the coiled configuration in which the hose is typically stored as indicated generally in FIG. 7.

Figure 8:
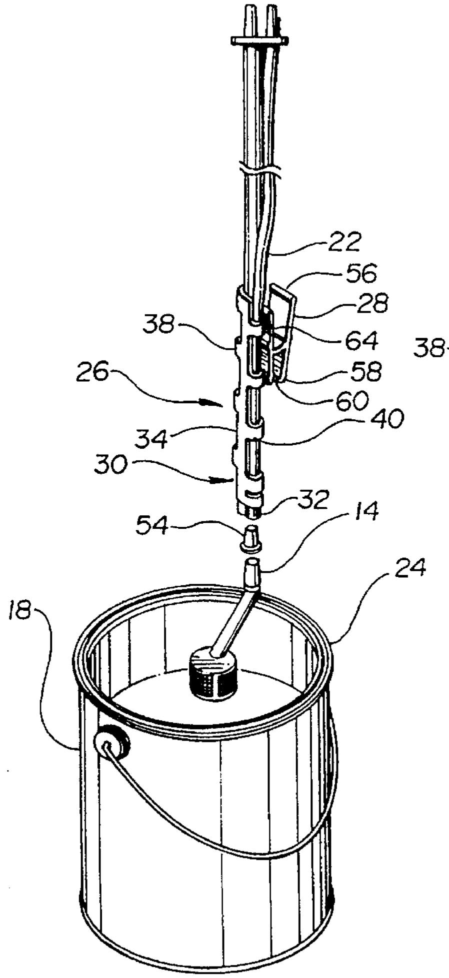
FIG. 8 is a perspective view of the suction hose and filter holder of the present invention carrying a suction hose and including an exploded view of an adapter, syphon tube and bucket useful in connection with the holder of the present invention.

To overcome this shortcoming of the prior art, an improved suction hose and filter holder apparatus 26 may be seen in FIG. 8. Apparatus 26 may include the elongated double lumen hose 22 of FIG. 7 along with a holder 27. In another embodiment (not shown), apparatus 26 may include a single lumen hose, in which case the spray gun may have a small cup attached to it in a manner similar to that of cup 12 to catch and retain paint which may leak past the pumping apparatus in the gun. In a still further alternative embodiment, apparatus 26 may also include the syphon tube and filter assembly 14 and an adapter 54.

Referring now most particularly to FIGS. 3–6, holder 27 preferably includes a clip 28 for holding the apparatus 26 to the rim 24 of the paint can or container 18. Holder 27 also includes a guide 30 integrally formed with clip 28 and positioned to extend from the rim 24 into an interior of the paint container 18 for submerging flexible hose 22 therein while rigidly restraining and positioning an end 32 of the hose 22 in a bottom region of the paint container 18. Guide 30 restrains end 32 of hose 22 from curling away from the bottom of the container 18 in response to a memory of the hose 22 from being curled in storage. An example of such curling may be seen in FIG. 7 where the unrestrained end 32 exhibits such memory.

Figure 3:
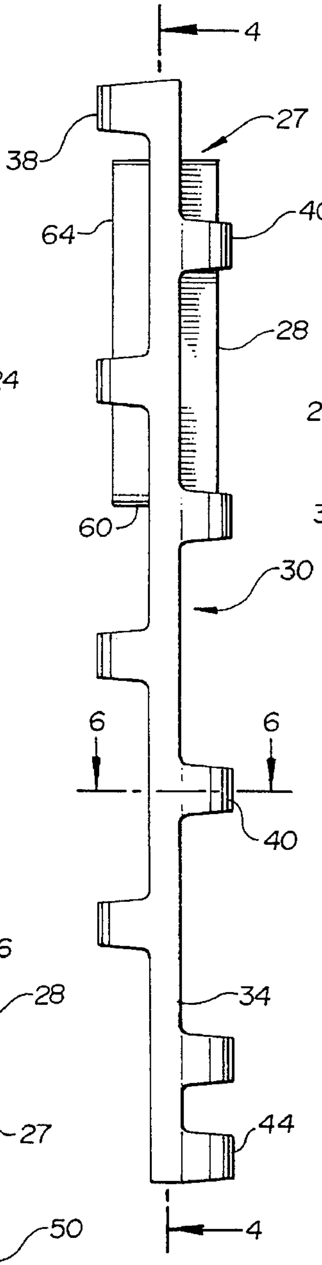
FIG. 3 is a side elevation view of the suction hose and filter holder of the present invention.
Figure 4:
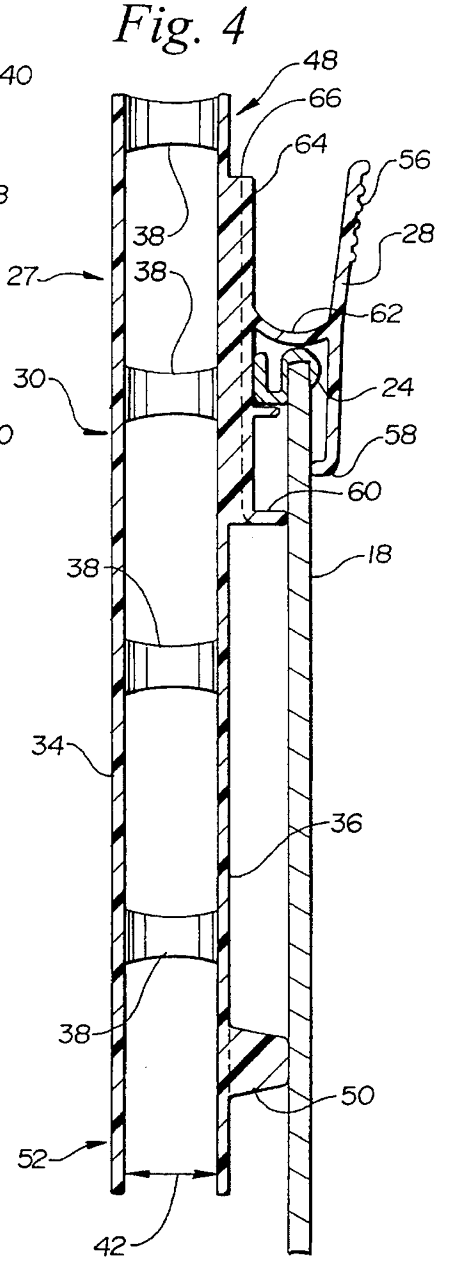
FIG. 4 is a section view of the suction hose and filter holder taken along line 4—4 in FIG. 3 and including a fragmentary section view of a paint bucket on which the holder is mounted.
Figure 5:
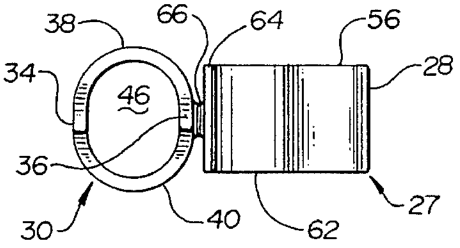
FIG. 5 is a top view of the suction hose and filter holder of the present invention.
Figure 6:
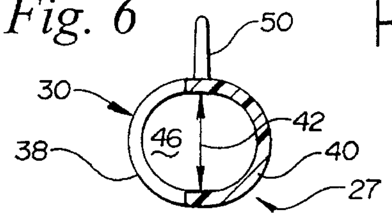
FIG. 6 is a section view of the suction and filter holder taken along line 6—6 in FIG. 3.

Referring now most particularly to FIGS. 3 and 4, the guide 30 also preferably includes a pair of longitudinally extending ribs 34, 36 and a plurality of cross members 38, 40 extending transversely between and spacing the ribs 34, 36 apart by a predetermined distance 42 greater than a width of the double lumen hose 22. As may be seen most clearly in FIGS. 5, 6 and 8, each cross member 38, 40 is preferably arcuately shaped. Except for the lowermost cross member 44, each successive cross member is positioned alternately on opposite transverse sides of ribs 34, 36. The cross members 38, 40, 42 together with ribs 34, 36 define a generally oval-shaped passage 46 through guide 30. Clip 28 is preferably located at a proximal or upper end 48 of guide 30 and an integrally formed spacer 50 is preferably located at a distal end 52 of guide 30 to space the guide 30 away from the interior of container 18 at the distal or lower end 52 of guide 30. A relatively rigid syphon tube and filter 14 is connected to a distal end 32 of the hose 22 for drawing and filtering paint from the bottom region of the container 18. Because a variety of syphon tubes 14 may be used, it is also to be understood that an adapter 54 having opposed unequal diameter ends may be interposed between the syphon tube 14 and the hose 22 for coupling unequal diameters in the syphon tube and hose.

Figure 7:
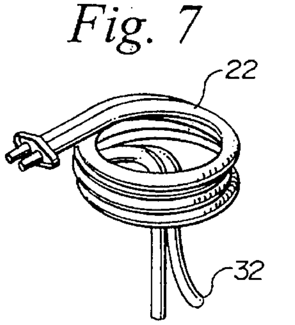
FIG. 7 is a perspective view of a suction hose useful with the holder of the present invention.

Referring now most particularly to FIGS. 7 and 8, to assemble the apparatus 26 of the present invention, hose 22 is preferable uncoiled from its storage condition or position as shown in FIG. 7, and the distal end 32 of the hose is passed through guide 30 from proximal end 48 along passage 46 until the distal end 32 of hose 22 exits the distal end 52 of guide 30. The syphon tube and filter assembly 14 is then connected either directly or via adapter 54 to the distal end 32 of hose 22, and the apparatus 26 is then placed into container 18 and clip 28 is opened by compressing handle 56 spreading movable jaw 58 apart from fixed jaw 60 to enable placing holder 27 on the rim 24 of container 18 as shown in FIG. 4. Handle 56 is then released permitting jaw 58 to retract towards jaw 60 retaining guide 30 to the side of the paint container 18. It is to be understood that clip 28 preferably has an integrally formed living hinge 62 formed to bias jaws 58 and 60 closed when handle 56 is released. It is further to be understood that handle 56 is a moveable handle, while a stationary portion 64 is secured to rib 36 via a web 66 (see FIG. 5)

The invention is not to be taken as limited to all of the details thereof as modifications and variations thereof may be made without departing from the spirit or scope of the invention.

What is claimed is:

1. An improved suction hose and filter holder apparatus for use with a flexible hose and paint filter for drawing paint from a container remote from a hand-held paint spray gun, the apparatus comprising:

a) a clip for holding the apparatus to a rim of the paint container;

b) a guide integrally formed with the clip and positioned relative to the clip so as to extend from the rim into an interior of the paint container when the apparatus is connected to the paint container wherein the guide is adapted to submerge and directly and rigidly contact and restrain an end of the flexible hose in a bottom region of the paint container such that the hose is restrained from curling away from the bottom of the container in response to a memory of the hose from being curled in storage when the hose is received in the guide of the improved suction hose and filter holder apparatus and the apparatus is clipped to the paint container.

2. The apparatus of claim 1 wherein the guide further comprises i) a pair of longitudinally extending ribs, and ii) a plurality of cross members extending transversely between and spacing the ribs apart by a predetermined distance greater than a width of the hose.

3. The apparatus of claim 2 wherein each cross member is arcuately shaped.

4. The apparatus of claim 2 wherein successive cross members are positioned alternately on opposite transverse sides of the ribs.

5. The apparatus of claim 4 wherein the guide has a generally oval shaped passage therethrough defined by the ribs and cross members.

6. The apparatus of claim 1 wherein the clip is located at a proximal end of the guide.

7. The apparatus of claim 6 further comprising a spacer integrally formed with and located at the end of the guide to space the guide away from the interior of the container at the end of the guide.

8. The apparatus of claim 1 in combination with the flexible hose and paint filter, wherein the flexible hose further comprises an elongated double lumen hose received in the guide wherein the end of the hose is located at an end of the guide in the interior of the paint container; and the paint filter is connected to the end of the hose for drawing and filtering paint from the bottom region of the container.

9. The apparatus of claim 8 further comprising:

e) a generally rigid syphon tube interposed between the paint filter and the hose.

10. The apparatus of claim 9 still further comprising f) an adapter having opposed, unequal diameter ends interposed between the syphon tube and the hose for coupling unequal diameters in the syphon tube and hose.

11. The apparatus of claim 1 in combination with the flexible hose and wherein the flexible hose further comprises an elongated single lumen hose received in the guide for drawing paint from the bottom region of the paint container.

* * * * *